United States Patent Office 3,310,570
Patented Mar. 21, 1967

3,310,570
TRIFLUOROMETHYL-SUBSTITUTED 4-OXAZOL-
IDONES AND THEIR PREPARATION
William J. Middleton, Wilmington, Del., assignor to E. I.
du Pont de Nemours and Company, Wilmington, Del.,
a corporation of Delaware
No Drawing. Filed Feb. 26, 1965, Ser. No. 435,734
9 Claims. (Cl. 260—299)

This invention relates to, and has as its principal objects provision of, certain novel oxazolidones and the preparation of the same.

The novel compounds of this invention are 4-oxazolidones of the formula

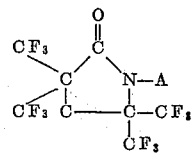

wherein A is hydrogen, quaternary ammonium, a metal of Group I-A, I-B, II-A or II-B of the Periodic Table, i.e., Li, Na, K, Rb, Cs, Cu, Ag, Au, Be, Mg, Ca, Sr, Ba, Zn, Cd, or Hg, or alkyl or cycloalkyl of up to 10 carbons.

The compounds in which A is an alkali metal or quaternary ammonium are prepared by the reaction of at least two molecular equivalents of hexafluoroacetone with one molecular equivalent of an alkali metal or quaternary ammonium cyanide. A representative reaction can be shown by the equation

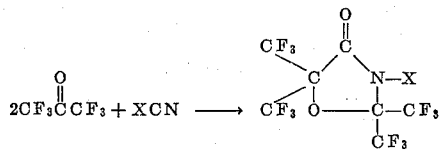

where X is an alkali metal or quaternary ammonium, e.g., tetraalkylammonium in which the alkyl groups have up to 4 carbons, such as tetraethylammonium and tetrabutylammonium. This reaction can be conducted either without solvent or in the presence of a solvent or an inert reaction medium such as a carbonitrile, ether, or hydrocarbon. A preferred reaction medium is acetonitrile. The temperature is not critical, and can be as low as —80° C. or as high as 200° C. The preferred temperature range is from 0° to 100° C. Time and pressure are also not critical. The salt need not be isolated from the reaction mixture prior to further reaction with acids or with alkylating agents. However, the salt can be isolated, if desired, by evaporation of the reaction mixture to dryness.

2,2,5,5-tetrakis(trifluoromethyl)-4-oxazolidone (A=H) is prepared by treating the salts that are obtained from the reaction of an alkali metal cyanide and hexafluoroacetone with an acid, such as hydrochloric acid or sulfuric acid. The reaction with the acid is conveniently carried out by adding at least one equivalent of the acid to the reaction mixture of the alkali metal cyanide with hexafluoroacetone. It is not necessary to isolate the salt of the 4-oxazolidone prior to acidification. The 2,2,5,5-tetrakis(trifluoromethyl)-4-oxazolidone can be isolated from the organic portion of the reaction mixture by conventional means, e.g., by distillation.

The salts of the 4-oxazolidones with Groups I-B, II-A and II-B metals, i.e., copper, silver, gold, beryllium, magnesium, calcium, strontium, barium, zinc, cadmium, and mercury, can be prepared by metathesis of the alkali metal salts. For example, the addition of an acetonitrile solution of silver nitrate to an acetonitrile solution of the sodium salt of 2,2,5,5-tetrakis(trifluoromethyl)-4-oxazolidone at ordinary room temperature results in the precipitation of sodium nitrate leaving the desired silver salt of the 4-oxazolidone in solutoin. On removal of the precipitated sodium salt by filtration, the silver salt can be isolated from the filtrate by distillation.

The 4-oxazolidones of the general formula given above where A is alkyl or cycloalkyl are prepared by treating 2,2,5,5-tetrakis(trifluoromethyl)-4-oxazolidone or its alkali metal salts with alkylating or cycloalkylating agents, such as alkyl and cycloalkyl halides, alkyl and cycloalkyl sulfates or diazoalkanes. The preparation of the 3-alkyl-(or 3-cycloalkyl-) 4-oxazolidones by means of alkyl or cycloalkyl sulfates can be carried out by adding an excess, e.g., a 50–100% excess, of a dialkyl or dicycloalkyl sulfate to a solution of 2,2,5,5-tetrakis(trifluoromethyl)-4-oxazolidone or, preferably, an alkali metal salt thereof in an inert solvent, e.g., acetonitrile, and the mixture maintained at a reaction temperature of 0° to 100° C. for several hours, e.g., 10–24 hours. At the end of this reaction period, water is added to dissolve the precipitated salt. The organic layer is separated, dried and distilled to give the desired 2,2,5,5-tetrakis(trifluoromethyl)-3-alkyl- (or 3-cycloalkyl-) 4-oxazolidone.

The alkylation of 4-oxazolidones with diazoalkanes is carried out by adding a solution of a diazoalkane, e.g., diazomethane, in an inert solvent such as an ether, gradually to a solution of 2,2,5,5-tetrakis(trifluoromethyl)-4-oxazolidone in an ether at —80° to 35° C. Addition of the diazoalkane solution is continued until a faint yellow color persists in the reaction mixture, about one molecular equivalent of the diazoalkane being required. The reaction mixture is then distilled to isolate the 3-alkyloxazolidone.

The reaction with an alkyl or cycloalkyl halide as alkylating agent is carried out by adding a molecular equivalent of an alkyl or cycloalkyl halide, i.e., chloride, bromide, or iodide, to a solution of a salt of 2,2,5,5-tetrakis(trifluoromethyl)-4-oxazolidone with a Group I metal in an inert solvent, e.g., acetonitrile, at a temperature of 0° to 150° C. The Group I metal halide which forms precipitates from the reaction mixture. After removal of the precipitated metal halide by filtration, distillation of the filtrate yields the 3-alkyl (or 3-cycloalkyl)-2,2,5,5-tetrakis(trifluoromethyl)-4-oxazolidone.

Oxazolines of the formula

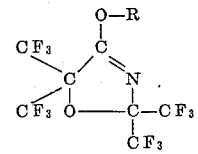

in which R is an alkyl or cycloalkyl group of up to ten carbon atoms are also formed along with the 3-alkyloxazolidones in these alkylation reactions.

There follow some nonlimiting examples which illustrate the invention in more detail. In these examples, temperatures and pressures are ambient unless otherwise noted.

EXAMPLE 1

2,2,5,5-tetrakis(trifluoromethyl)-4-oxazolidone

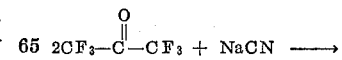

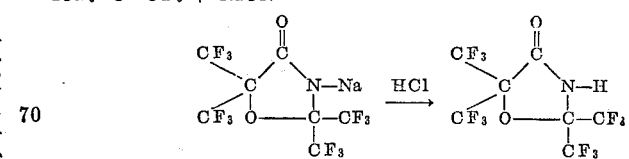

Hexafluoroacetone, 100 ml. at −78° C. (ca. 1 mole), was slowly distilled over a period of 30 minutes into a stirred suspension of 24.5 g. (0.5 mole) of sodium cyanide in 300 ml. of acetonitrile. The reaction mixture warmed to 60° C. during the addition. The mixture was cooled and mixed with 200 ml. of concentrated hydrochloric acid. The organic layer was separated, washed with water, and distilled. There was obtained 143 g. (80%) of 2,2,5,5-tetrakis(trifluoromethyl)-4-oxazolidone as a colorless distillate, B.P. 160–165° C., that solidified to a white solid, M.P. 102–105° C., upon cooling. Recrystallization from benzene gave 119 g. of colorless needles M.P. 106–107° C., I.R. 5.62μ. The $F^{19}$ NMR in $CHCl_3$ solution showed two septets in the $CF_3$ region.

Analysis.—Calcd. for $C_7HF_{12}NO_2$: C, 23.41; H, 0.28; F, 63.49; N, 3.90. Found: C, 23.74; H, 0.49; F, 63.13; N, 4.10.

*Reduction of 2,2,5,5-tetrakis(trifluoromethyl) 4-oxazolidone*

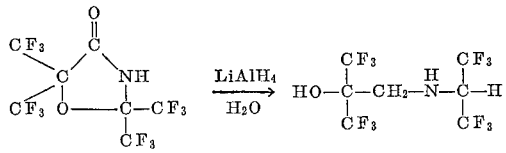

A solution of 35.9 g. (0.1 mole) of 2,2,5,5-tetrakis(trifluoromethyl)-4-oxazolidone in 50 ml. of diethyl ether was added dropwise over a period of 30 minutes to a stirred solution of 5.0 g. of lithium aluminum hydride in 100 ml. of diethyl ether. The reaction mixture was heated to reflux for 20 hours and then cooled to 0° C. The excess hydride was decomposed by adding successively 5 ml. of water, 5 ml. of 15% aqueous sodium hydroxide, and 15 ml. of water. The mixture was stirred for 2 hours and then filtered, and the filtrate was distilled to give 4.65 g. of N-(2,2,2-trifluoro-1-trifluoromethylethyl) - N - (3,3,3 - trifluoro - 2 - trifluoromethyl-2-hydroxypropyl)amine as a colorless liquid, B.P. 140–140.5° C., $n_D^{25}$ 1.3140. The proton NMR spectrum showed a singlet (area 1) at 4.40 p.p.m. for OH, a doublet (J=7.5 c.p.s., area 2) at 3.15 p.p.m. for $CH_2$, a multiplet (area 1) at 3.50 p.p.m. for $C(CF_3)_2H$, and a broad multiplet (area 1) at 2.1 p.p.m. for NH. After exchange with $D_2O$, the spectrum simplified to a singlet (area 2) at 3.15 p.p.m. (uncoupled $CH_2$) and a septet (J=7 c.p.s.) at 3.50 p.p.m. The $F^{19}$ NMR showed a doublet and a singlet of equal area.

Analysis.—Calcd. for $C_7H_5F_{12}NO$: C, 24.22; H, 1.45; F, 65.68; N, 4.04. Found: C, 24.59; H, 1.71; F, 65.78; N, 4.21.

EXAMPLE 2

*2,2,5,5-tetrakis(trifluoromethyl)-3-methyl-4-oxazolidone*

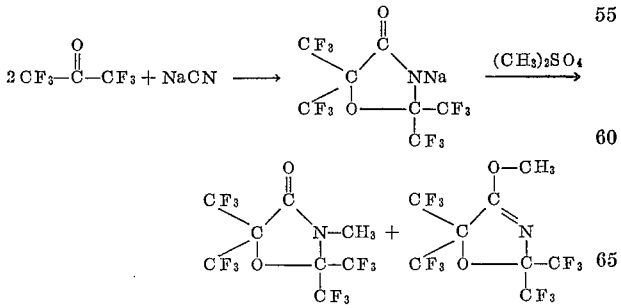

Hexafluoroacetone, 125 ml. at −78° C. (1.2 mole), was distilled over a period of 30 minutes into a stirred suspension of 30 g. (0.6 mole) of sodium cyanide in 500 ml. of acetonitrile. The reaction mixture warmed to 50° C. during the addition. The mixture was cooled to 25° C., 126 g. (1 mole) of dimethyl sulfate was added, and the resulting mixture was stirred for 18 hours at 25° C. Water was added to dissolve the precipitated salts and the organic layer was separated, washed with water, and dried over anhydrous magnesium sulfate.

Distillation gave 190 g. (85% yield) of 2,2,5,5-tetrakis-(trifluoromethyl)-3-methyl-4-oxazolidone as a colorless oil, B.P. 135–136° C., $n_D^{25}$ 1.3218, I.R. 5.60μ. The $F^{19}$ NMR spectrum showed two septets centered at 407 and 550 c.p.s. higher field from "Freon 112"®. The proton NMR showed a singlet at 3.25 p.p.m. with a width at ½ height of 3.2 c.p.s. Gas chromatographic analysis indicated the sample was contaminated with 3% of the isomeric 2,2,5,5 - tetrakis(trifluoromethyl)-4-methoxy-3-oxazoline, identified by retention time and infrared analysis.

Analysis.—Calcd. for $C_8H_3F_{12}NO_2$: C, 25.75; H, 0.81; F, 61.11; N, 3.78. Found: C, 26.22; H, 1.22; F, 60.82; N, 4.22.

*Reduction of 2,2,5,5-tetrakis(trifluoromethyl)-3-methyl-4-oxazolidone*

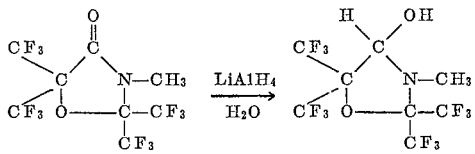

A solution of 37.3 g. (0.1 mole) of 2,2,5,5-tetrakis(trifluoromethyl)-3-methyl-4-oxazolidone in 40 ml. of diethyl ether was added dropwise to a stirred solution of 5.0 g. of lithium aluminum hydride in 140 ml. of diethyl ether. The reaction mixture was heated to reflux for 20 hours, and then cooled to 0° C. The excess hydride was decomposed by adding successively 5 ml. of 15% aqueous sodium hydroxide and 15 ml. of water. The mixture was stirred for 2 hours and filtered, and the filtrate was distilled. There was obtained 8.55 g. of 2,2,5,5-tetrakis(trifluoromethyl)-3-methyl-4-hydroxyoxazolidine as a colorless liquid, B.P. 148.5–150° C., that solidified to a white solid, M.P. 49–51° C., on cooling. The I.R. spectrum showed bands at 2.77 and 2.87μ for OH. The proton NMR spectrum showed a singlet at 2.80 p.p.m. (area 3), broad doublets at 3.25 p.p.m. (J=7 c.p.s., area 1) and 5.22 p.p.m. (J=7 c.p.s., area 1). Exchange with $D_2O$ removes the 3.25 p.p.m. peak and converts the 5.22 p.p.m. peak to a singlet. The $F^{19}$ NMR spectrum showed 4 complex multiplets of equal area in the $CF_3$ region.

Analysis.—Calcd. for $C_8H_5F_{12}NO_2$: C, 25.61; H, 1.35; F, 60.78; N, 3.74. Found: C, 25.89; H, 1.51; F, 60.01; N, 3.41.

EXAMPLE 3

*Alkylation of 2,2,5,5-tetrakis(trifluoromethyl)-4-oxazolidone with diazomethane*

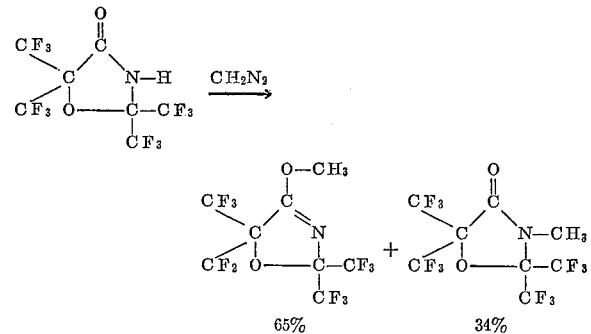

A 2.5% solution of diazomethane in diethyl ether was added portionwise to a solution of 17.95 g. (0.05 mole) of 2,2,5,5-tetrakis(trifluoromethyl)-4-oxazolidone in 25 ml. of diethyl ether at 25° C. until a faint yellow color persisted. The addition required about 10 minutes. Distillation gave a colorless oil, B.P. 128–136° C., $n_D^{25}$ 1.3111.

Analysis.—Calcd. for $C_8H_3F_{12}NO_2$: C, 25.75; H, 0.81; F, 61.11; N, 3.78. Found: C, 26.17; H, 1.08; F, 60.87; N, 3.52.

Gas chromatographic analysis indicated the product was a mixture of two components in the ratio of 65:34. The more abundant component, 2,2,5,5-tetrakis(trifluoromethyl)-4-methoxy-3-oxazoline, was separated by preparative gas chromatography. It was obtained as a colorless solid, M.P. 30° C., I.R. 5.95μ. The proton NMR spectrum showed a singlet at 4.19 p.p.m. (in CDCl$_3$) with a width at ½ height of 0.8 c.p.s. The F$^{19}$ NMR spectrum showed two septets centered at 382 and 625 c.p.s. higher field from "Freon 112"®.

Analysis.—Calcd. for C$_8$H$_3$F$_{12}$NO$_2$: C, 25.75; H, 0.81; F, 61.11; N, 3.78. Found: C, 25.61; H, 1.15; F, 60.49; N, 3.69.

The less abundant component was identified as 2,2,5,5-tetrakis(trifluoromethyl)-3-methyl-4-oxazolidone by comparison of its infrared spectrum and gas chromatographic retention time with an authentic sample (Example 2).

EXAMPLE 4

*2,2,5,5-tetrakis(trifluoromethyl)-3-ethyl - 4 - oxazolidone and 2,2,5,5 - tetrakis(trifluoromethyl)-4-ethoxy-3-oxazoline*

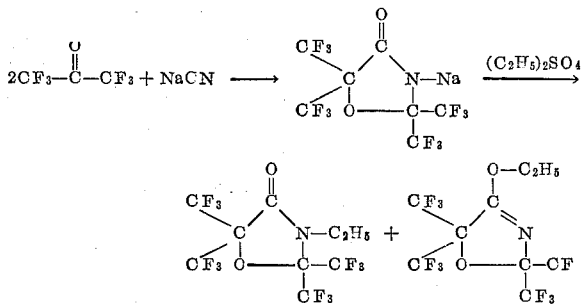

Hexafluoroacetone, 125 ml. at −78° C. (1.2 mole), was distilled over a period of 30 minutes into a stirred suspension of 30 g. (0.6 mole) of sodium cyanide in 500 ml. of acetonitrile. The reaction mixture warmed to 50° C. during the addition. The mixture was cooled to 25° C., 150 g. of diethyl sulfate was added, and the resulting mixture was stirred for 18 hours at 25° C. Water was added to dissolve the precipitated salts, and the organic layer was separated, washed with 5% sodium bicarbonate solution and then with water and dried over anhydrous magnesium sulfate. Distillation gave 147 g. (61%) of a colorless oil, B.P. 140–141° C., $n_D^{25}$ 1.3234.

Analysis.—Calcd. for C$_9$H$_5$F$_{12}$O$_2$N: C, 27.93; H, 1.30; F, 58.88; N, 3.62. Found: C, 28.42; H, 1.59; F, 58.71; N, 3.78.

Gas chromatographic analysis indicated the product was a mixture of two components in the ratio of 47.53. Samples of each component were separated by preparative gas chromatography for further characterization.

2,2,5,5 - tetrakis(trifluoromethyl) - 4 - ethoxy-3-oxazoline, the 47% component, was obtained as a colorless oil, B.P. 136° C., $n_D^{25}$ 1.3178, I.R. 5.98μ. The proton NMR showed a quartet at 4.62 p.p.m. (J=7 c.p.s.) of area 2 and a triplet at 1.43 p.p.m. (J=7 c.p.s.) of area 3. The F$^{19}$ NMR showed two septets centered at 370 c.p.s. and 620 c.p.s. higher field than "Freon 112"®.

Analysis.—C, 28.03; H, 1.50; F, 58.72; N, 3.75.

2,2,5,5-tetrakis(trifluoromethyl) - 3 - ethyl-4-oxazolidone, the 53% component, was obtained as a colorless oil, B.P. 142° C., $n_D^{25}$ 1.3263, I.R. 5.65μ. The proton NMR showed a quartet at 3.72 p.p.m. (J=7 c.p.s.) of area 2 and a triplet at 1.35 p.p.m. (J=7 c.p.s.) of area 3. The F$^{19}$ NMR showed two septets centered at 405 and 550 c.p.s. higher field than "Freon 112"®.

Analysis.—C, 28.08; H, 1.55; F, 58.78; N, 3.75.

EXAMPLE 5

*Reaction of silver salt of 2,2,5,5-tetrakis(trifluoromethyl)-4-oxazolidone with ethyl iodide*

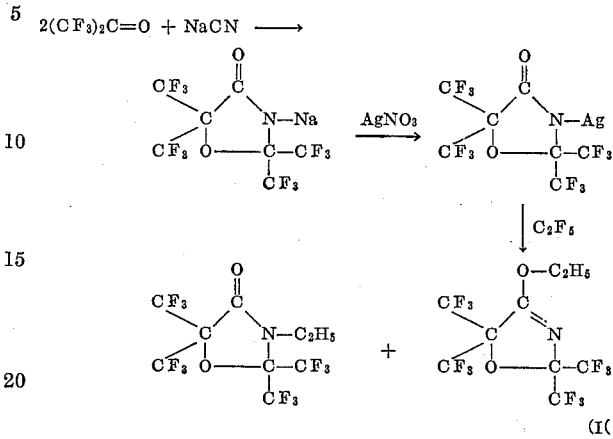

(I()

Hexafluoroacetone, 21 ml. at −78° C. (0.2 mole), was distilled into a stirred suspension of 4.9 g. (0.1 mole) of sodium cyanide in 100 ml. of acetonitrile. A solution of 17.0 g. (0.1 mole) of silver nitrate in 25 ml. of acetonitrile was then added at room temperature, and the sodium nitrate that precipitated was removed by filtration. Ethyl iodide, 15.6 g. (0.1 mole) was added to the solution of the silver salt. An exothermic reaction ensued and a precipitate formed. The reaction mixture stood for 20 hours at room temperature, and then was filtered. Distillation of the filtrate gave 25 g. of a colorless oil, B.P. 140–141° C., $n_D^{25}$ 1.3280. Infrared, proton NMR, and gas chromatographic analysis showed this product consisted of an approximately 50:50 mixture of 2,2,5,5-tetrakis(trifluoromethyl) - 3 - ethyl-4-oxazolidone and 2,2,5,5 - tetrakis(trifluoromethyl) - 4 - ethoxy - 3-oxazoline.

EXAMPLE 6

*Sodium salt of 2,2,5,5-tetrakis(trifluoromethyl)-4-oxazolidone*

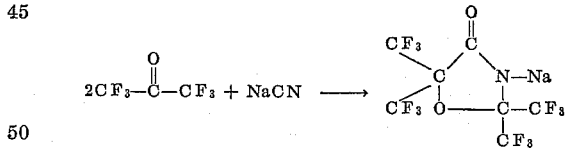

Hexafluoroacetone, 42 ml. at −78° C. (ca. 0.4 mole), was slowly distilled into a stirred suspension of 9.8 g. (0.2 mole) of sodium cyanide in 200 ml. of acetonitrile. The reaction mixture was cooled to 25° C. and filtered. The filtrate was evaporated to dryness under reduced pressure. There was obtained 72 g. of the sodium salt of 2,2,5,5-tetrakis(trifluoromethyl) - 4 - oxazolidone as a white powder, M.P. 165–175° C. (d), I.R. 6.0μ.

Analysis.—Calcd. for C$_7$F$_{12}$NNaO: Na, 6.30. Found: Na, 6.36.

The invention is further illustrated by the following reactions in which the named reactants yield the named products:

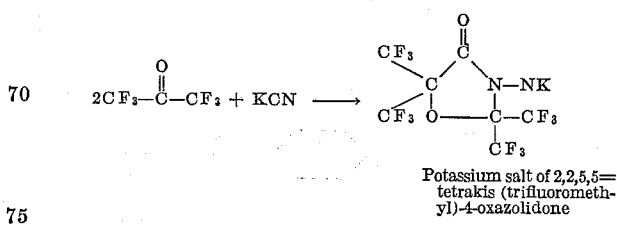

Potassium salt of 2,2,5,5= tetrakis (trifluoromethyl)-4-oxazolidone

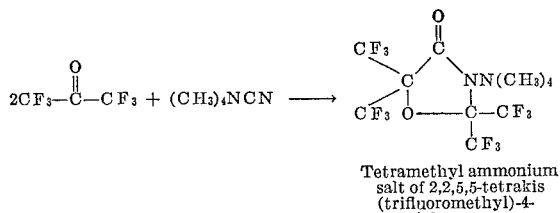

Tetramethyl ammonium salt of 2,2,5,5-tetrakis(trifluoromethyl)-4-oxazolidone

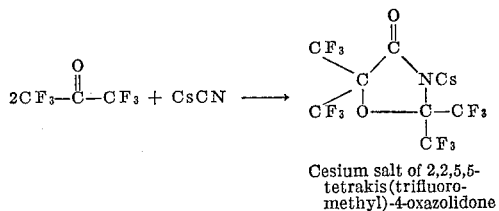

Cesium salt of 2,2,5,5-tetrakis(trifluoromethyl)-4-oxazolidone

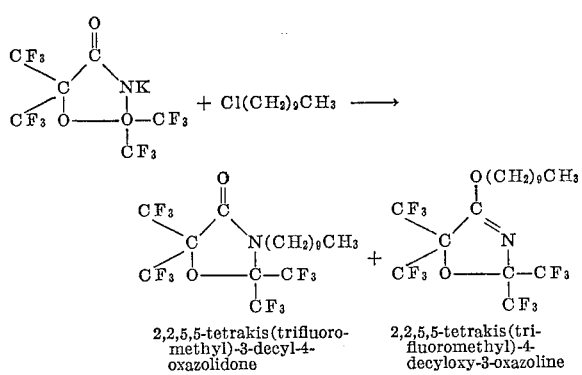

2,2,5,5-tetrakis(trifluoromethyl)-3-decyl-4-oxazolidone 2,2,5,5-tetrakis(trifluoromethyl)-4-decyloxy-3-oxazoline

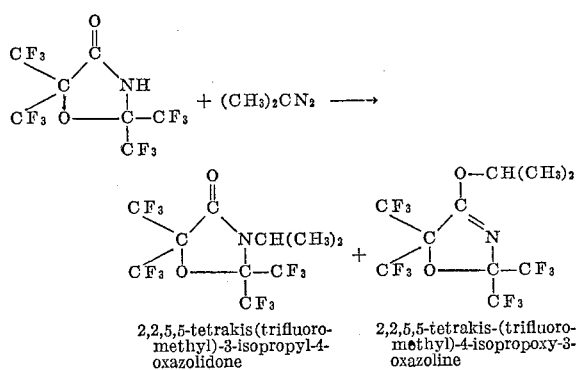

2,2,5,5-tetrakis(trifluoromethyl)-3-isopropyl-4-oxazolidone 2,2,5,5-tetrakis-(trifluoromethyl)-4-isopropoxy-3-oxazoline

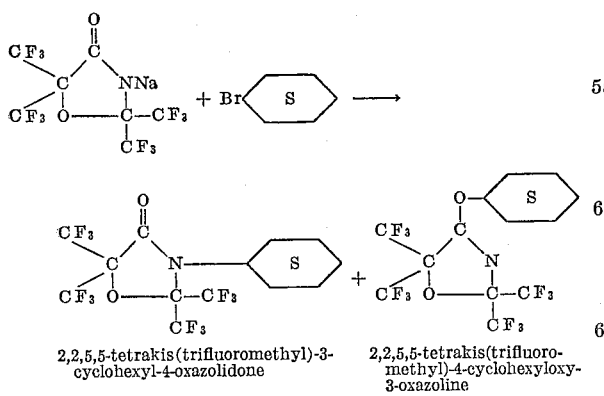

2,2,5,5-tetrakis(trifluoromethyl)-3-cyclohexyl-4-oxazolidone 2,2,5,5-tetrakis(trifluoromethyl)-4-cyclohexyloxy-3-oxazoline

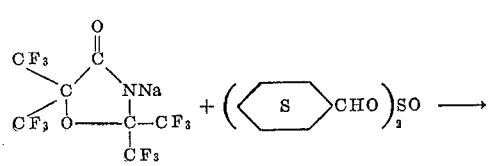

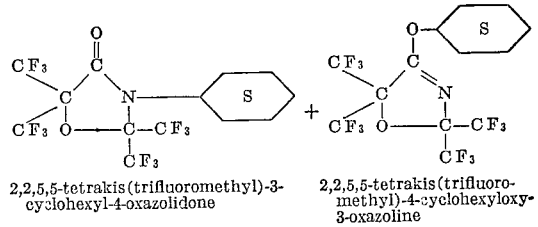

2,2,5,5-tetrakis(trifluoromethyl)-3-cyclohexyl-4-oxazolidone 2,2,5,5-tetrakis(trifluoromethyl)-4-cyclohexyloxy-3-oxazoline The 3-alkyl-4-oxazolidones of this invention are stable in contact with metal surfaces such as iron, steel, stainless steel, nickel and copper, even at elevated temperatures, and can therefore be employed in application which involve prolonged contact with these metals. Such applications include use as heat exchange and hydraulic fluids. The stability of the 3-alkyloxazolidones is illustrated by the following experiment:

*Example A.*—A 2 ml. sample of 2,2,5,5-tetrakis(trifluoromethyl)-3-methyl-4-oxazolidone and a soft iron coupon were sealed in an evacuated glass vial, and the vial was heated at 300° C. for 24 hours. The vial was cooled and opened. No change had occurred during the heating period.

Both the 3-alkyloxazolidones and the 4-alkoxyoxazolines of this invention are useful solvents for polymers containing a high percentage of fluorine. Solutions of these polymers prepared with the solvents of this invention can be used to coat cloth or paper to render them oil and water repellent, as illustrated by the following examples:

*Examples B, C and D.*—Five-percent solutions of low-melting polytetrafluoroethylene polymer (M.P. 83–145°) were prepared in the following solvents: 2,2,5,5-tetrakis(trifluoromethyl)-3-methyl-4-oxazolidone, 2,2,5,5-tetrakis(trifluoromethyl)-3-ethyl-4-oxazolidone, and 2,2,5,5-tetrakis(trifluoromethyl) - 4 - ethoxy - 3 - oxazoline. Separate pieces of filter paper were coated with each of these solutions, and the coated papers were dried. The paper prepared in this manner is oil and water repellent. The uncoated paper is easily saturated with oil and water.

The salts of the 2,2,5,5-tetrakis(trifluoromethyl)-4-oxazolidones are useful as flame-proofing agents. For example, a solution of the metal or quaternary ammonium salt in acetonitrile can be used to impregnate cellulosic fabrics with the salt to reduce their flammability.

Since obvious modifications and equivalents will be evident to those skilled in the chemical arts, I propose to be bound solely by the appended claims.

The embodiments of the invention in which an exclusive property or privilege is claimed are defined as follows:

1. A 4-oxazolidone of the formula

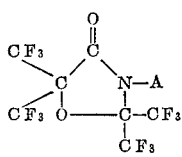

wherein A is selected from the group consisting of hydrogen, quaternary ammonium, metals of Groups I–A, I–B, II–A and II–B of the Periodic Table, and alkyl and cycloalkyl of up to 10 carbons.

2. 2,2,5,5-tetrakis(trifluoromethyl)-4-oxazolidone.
3. An alkali metal salt of 2,2,5,5-tetrakis(trifluoromethyl)-4-oxazolidone.
4. The sodium salt of 2,2,5,5-tetrakis(trifluoromethyl)-4-oxazolidone.
5. The silver salt of 2,2,5,5-tetrakis(trifluoromethyl)-4-oxazolidone.

6. 2,2,5,5-tetrakis(trifluoromethyl)-3-methyl-4-oxazolidone.

7. 2,2,5,5 - tetrakis(trifluoromethyl) - 3 - ethyl - 4 - oxazolidone.

8. The process of preparing an alkali metal salt of 2,2,5,5 - tetrakis(trifluoromethyl) - 4 - oxazolidone which comprises reacting hexafluoroacetone with an alkali metal cyanide in a hexafluoroacetone: cyanide mole ratio of at least 2:1 at a temperature in the range −80° to 200° C.

9. The process of alkylating 2,2,5,5-tetrakis(trifluoromethyl)-4-oxazolidone which comprises reacting the same with a diazoalkane in which the alkyl group contains up to 10 carbon atoms at a temperature in the range of −80° to 35° C.

References Cited by the Examiner
UNITED STATES PATENTS

Bradley et al., J. Chem. Soc. (London), 1950, pp. 767–77.

Patcher et al., J. Am. Chem. Soc., vol. 74 (1952), pp. 1321–22.

Zeifman et al, Izvest. Akad, Nauk SSSR, Ser Khim. (September 1964), page 1624.

ALEX MAZEL, *Primary Examiner.*

HENRY R. JILES, *Examiner.*

RICHARD J. GALLAGHER, *Assistant Examiner.*